P. G. GARDINER.
Car Wheel.

No. 5,098.

Patented May 1, 1847.

UNITED STATES PATENT OFFICE.

PERRY G. GARDINER, OF NEW YORK, N. Y.

RAILROAD-CAR WHEEL.

Specification of Letters Patent No. 5,098, dated May 1, 1847.

*To all whom it may concern:*

Figure 2:
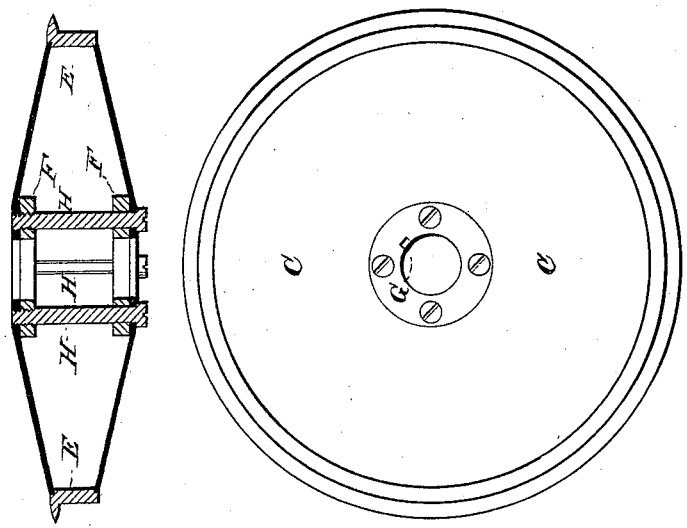
Figure 1:
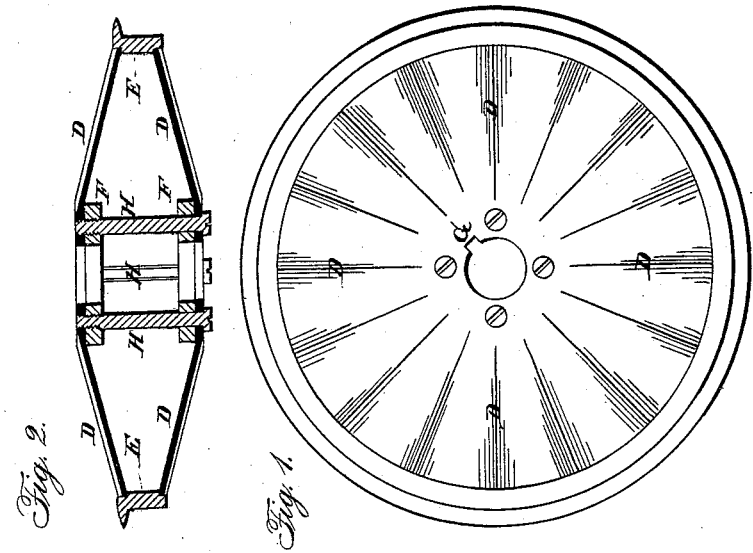

Be it known that I, PERRY G. GARDINER, of the city, county, and State of New York, have invented a new and Improved Method of Constructing Car or Truck Wheels; and I do hereby declare the following to be a full, clear, and exact description thereof, reference being had to Figures 1 and 2 of the accompanying drawings, making a part of this specification.

The nature of my invention consists in forming wheels of two corrugated, crimped, or convoluted disks of metal, having exterior convexities, united to a rim or tire by means of screw bolts, drawing inward the centers and expanding the peripheries of the disks into grooves in the inner side of the rim.

D, D, are the corrugated disks. The undulations in the disks radiate from center to circumference. E, is the tire or rim of the wheel, having grooves formed in its inner surface for the reception of the peripheries of the disks. H, H, H, H, are screw bolts inserted through the disks around the central aperture in the same, for drawing their central portion inward and forcing their outer edges into the grooves in the rim. Strong metallic rings F, F, are secured to the disks by the bolts H, H, and surround the apertures in the same, for the purpose of supporting the axle. The ends of the axle may be secured to the disks, and the supporting rings F, F, by means of flanches, bolts, &c., in any suitable or usual manner. The disks D, D, are corrugated and of an outwardly convex form, for the purpose of giving them additional strength, and for the purpose of rendering them expansible at their peripheries; so that by drawing inward their centers their peripheries will be enlarged and forced outward.

The tire or rim E, may be made of cast iron—chilled; of iron plated with steel, or of steel alone.

Having thus fully described my improved method of constructing car, or truck wheels, what I claim therein as new and desire to secure by Letters Patent, is—

The forming a wheel of two corrugated, crimped, or convoluted disks of metal with outward convexities, combined with a rim or tire by means of screw bolts drawing inward their centers and expanding their peripheries into grooves in the rim, substantially in the manner herein set forth.

P. G. GARDINER.

Witnesses:
R. N. HAVENS,
H. C. TOWNER.